United States Patent
Lee et al.

(10) Patent No.: US 9,490,947 B2
(45) Date of Patent: Nov. 8, 2016

(54) METHOD FOR REPORTING DOWNLINK CHANNEL STATE AND APPARATUS THEREFOR

(71) Applicant: LG Electronics Inc., Seoul (KR)

(72) Inventors: Hyunho Lee, Seoul (KR); Dongyoun Seo, Seoul (KR); Suckchel Yang, Seoul (KR); Hanjun Park, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 14/445,191

(22) Filed: Jul. 29, 2014

(65) Prior Publication Data

US 2015/0049706 A1    Feb. 19, 2015

Related U.S. Application Data

(60) Provisional application No. 61/866,558, filed on Aug. 16, 2013, provisional application No. 61/868,593, filed on Aug. 22, 2013.

(51) Int. Cl.
*H04L 5/00* (2006.01)
*H04W 72/12* (2009.01)

(52) U.S. Cl.
CPC ........... *H04L 5/0035* (2013.01); *H04L 5/0057* (2013.01); *H04L 5/0064* (2013.01); *H04L 5/0087* (2013.01); *H04L 5/001* (2013.01); *H04L 5/0023* (2013.01); *H04W 72/1226* (2013.01)

(58) Field of Classification Search
CPC ................... H04W 72/1226; H04W 72/1278; H04W 72/04; H04W 24/10; H04L 5/001; H04L 5/0023; H04L 5/0035; H04L 5/0064; H04L 5/0087; H04L 5/0057; H04L 1/0025; H04L 1/1896; H04L 5/0053; H04L 47/10; H04L 5/14; H04J 3/16

See application file for complete search history.

(56) References Cited

U.S. PATENT DOCUMENTS

| | | | |
|---|---|---|---|
| 2009/0190528 A1* | 7/2009 | Chung | H04B 7/0417 370/328 |
| 2010/0202311 A1* | 8/2010 | Lunttila | H04L 1/0027 370/252 |
| 2010/0322176 A1* | 12/2010 | Chen | H04B 7/024 370/329 |
| 2011/0103335 A1* | 5/2011 | Golitschek Edler Von Elbwart | H04L 1/0026 370/329 |
| 2011/0299484 A1* | 12/2011 | Nam | H04L 1/0025 370/329 |
| 2012/0088458 A1* | 4/2012 | Nogami | H04B 7/0632 455/67.11 |
| 2014/0044088 A1* | 2/2014 | Nogami | H04J 11/0069 370/329 |
| 2014/0086223 A1* | 3/2014 | Park | H04L 1/0031 370/336 |

* cited by examiner

*Primary Examiner* — Yee Lam
(74) *Attorney, Agent, or Firm* — Morgan, Lewis & Bockius LLP

(57) ABSTRACT

Provided is a method for reporting, by a user equipment, channel state to an eNodeB in a wireless communication system, the method comprising: receiving a request for an aperiodic channel state report and information on a configuration of a mode of the aperiodic channel state report; and transmitting the aperiodic channel state report through an uplink data channel according to the request and the configuration, wherein, if a bandwidth allocated for uplink is less than a predetermined bandwidth, only the aperiodic channel state report is transmitted through the uplink data channel, and wherein the predetermined bandwidth is set per mode of the aperiodic channel state report.

9 Claims, 6 Drawing Sheets

METHOD FOR REPORTING DOWNLINK CHANNEL STATE AND APPARATUS THEREFOR

This application claims priority to U.S. Provisional Application Nos. 61/866,558 filed on Aug. 16, 2013 and 61/868,593 filed on Aug. 22, 2013, which are incorporated by reference as if fully set forth herein.

BACKGROUND OF THE INVENTION

1. Field of the Invention

The present application relates to a wireless communication system, and more specifically, a method for reporting a downlink channel state and apparatus therefor.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention is directed to a method for efficiently performing downlink channel state reporting that substantially obviates one or more problems due to limitations and disadvantages of the related art.

In an aspect of the present application, provided herein is a method for reporting, by a UE, channel state to an eNB in a wireless communication system, the method comprising receiving a request for an aperiodic channel state report and information on a configuration of a mode of the aperiodic channel state report; and transmitting the aperiodic channel state report through an uplink data channel according to the request and the configuration. If a bandwidth allocated for uplink is less than a predetermined bandwidth, only the aperiodic channel state report may be transmitted through the uplink data channel, and the predetermined bandwidth may be set per mode of the aperiodic channel state report.

Additionally or alternatively, the aperiodic channel state report may be set for a plurality of channel state information (CSI) processes or a plurality of serving cells, if the bandwidth allocated for uplink is less than a sum of the predetermined bandwidth for respective of the aperiodic channel state report for the plurality of CSI processes or the plurality of serving cells, only the aperiodic channel state report may be transmitted through the uplink data channel.

Additionally or alternatively, the aperiodic channel state report may be set for a plurality of CSI processes or a plurality of serving cells, when a mode of the aperiodic channel state report for at least one of the plurality of CSI processes or the plurality of serving cells is a predetermined mode, only the aperiodic channel state report may be transmitted through the uplink data channel if a bandwidth allocated for uplink is less than a specific value.

Additionally or alternatively, the predetermined mode may include report of a subband precoding matrix indicator (PMI).

Additionally or alternatively, if a bandwidth allocated for uplink is greater than a predetermined bandwidth, the aperiodic channel state report may be transmitted along with uplink data through the uplink data channel.

In another aspect of the present application, provided herein is a method for receiving, by an eNB, a channel state report from a UE in a wireless communication system, the method comprising transmitting a request for an aperiodic channel state report and information on a configuration of a mode of the aperiodic channel state report; and receiving the aperiodic channel state report through an uplink data channel according to the request and the configuration, wherein, if a bandwidth allocated for uplink is less than a predetermined bandwidth, only the aperiodic channel state report may be received through the uplink data channel, and the predetermined bandwidth may be set per mode of the aperiodic channel state report.

Additionally or alternatively, the aperiodic channel state report may be set for a plurality of channel state information (CSI) processes or a plurality of serving cells, wherein, if the bandwidth allocated for uplink is less than a sum of the predetermined bandwidth for respective of the aperiodic channel state report for the plurality of CSI processes or the plurality of serving cells, only the aperiodic channel state report may be received through the uplink data channel.

Additionally or alternatively, the aperiodic channel state report may be set for a plurality of CSI processes or a plurality of serving cells, wherein, when a mode of the aperiodic channel state report for at least one of the plurality of CSI processes or the plurality of serving cells is a predetermined mode, only the aperiodic channel state report may be received through the uplink data channel if a bandwidth allocated for uplink is less than a specific value.

Additionally or alternatively, the predetermined mode may include report of a subband PMI.

Additionally or alternatively, if a bandwidth allocated for uplink is greater than a predetermined bandwidth, the aperiodic channel state report may be received along with uplink data through the uplink data channel.

In another aspect of the present application, provided herein is a UE (user equipment) configured to report a channel state to an eNB in a wireless communication system, comprising: a radio frequency (RF) unit; and a processor configured to control the RF unit, wherein the processor may be configured to receive a request for an aperiodic channel state report and information on a configuration of a mode of the aperiodic channel state report and to transmit the aperiodic channel state report through an uplink data channel according to the request and the configuration, wherein, if a bandwidth allocated for uplink is less than a predetermined bandwidth, only the aperiodic channel state report may be transmitted through the uplink data channel, and the predetermined bandwidth may be set per mode of the aperiodic channel state report.

The technical problems solved by the present invention are not limited to the above technical problems and other technical problems which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
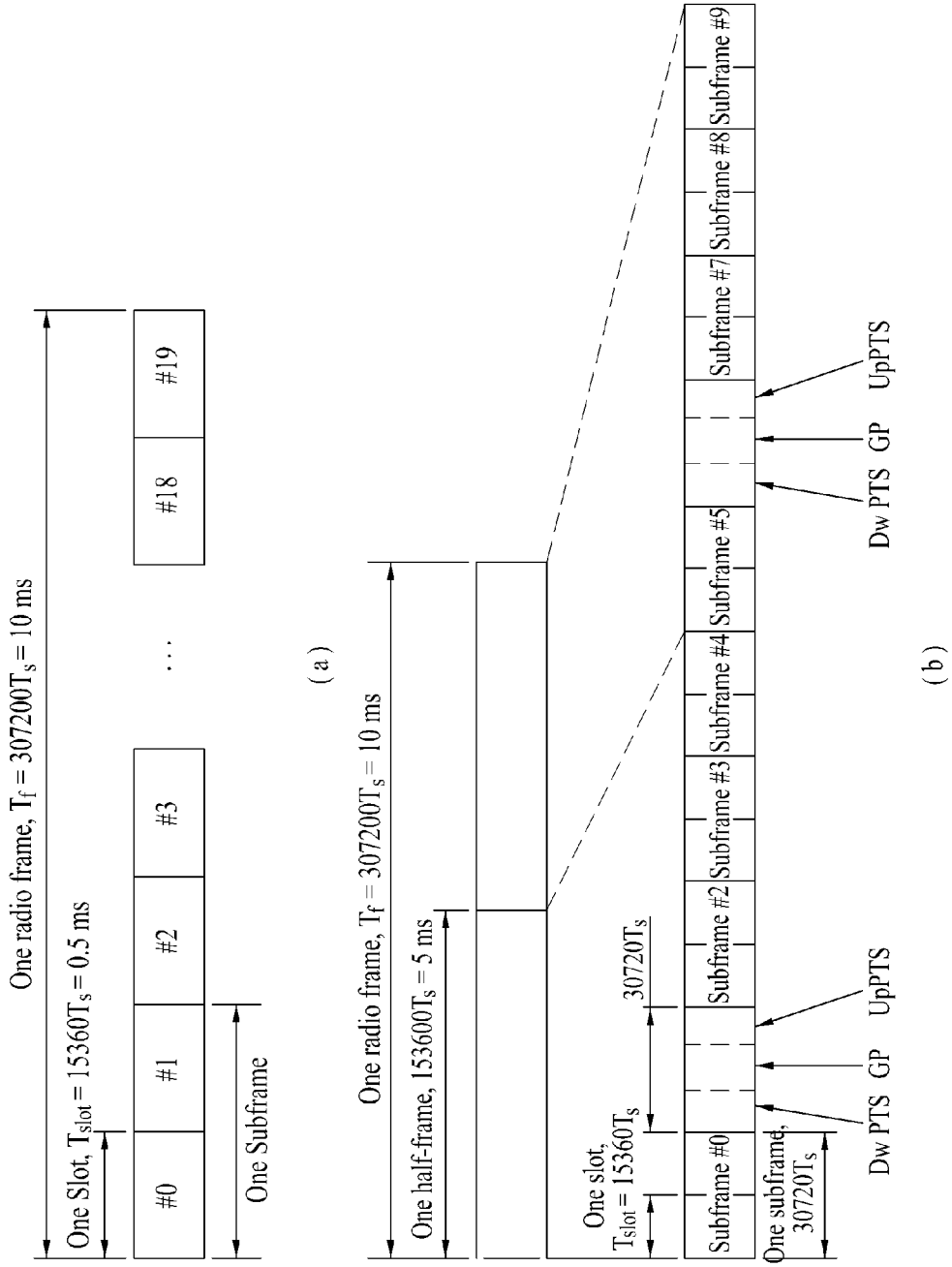
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

Figure 2:
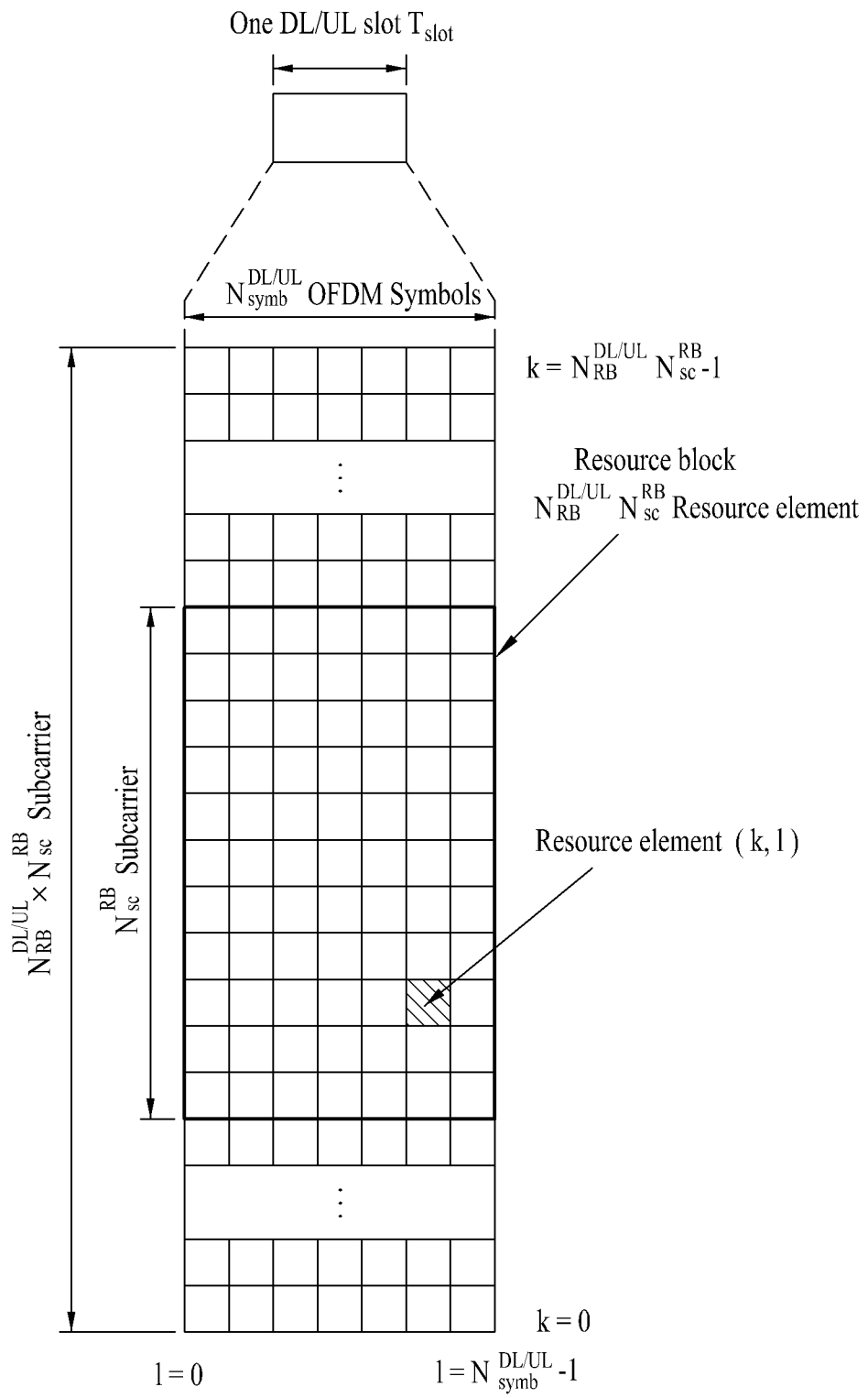
FIG. 2 is a diagram showing an example of a downlink/uplink (DL/UL) slot structure in a wireless communication system.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null sub-

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in carriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12)

consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
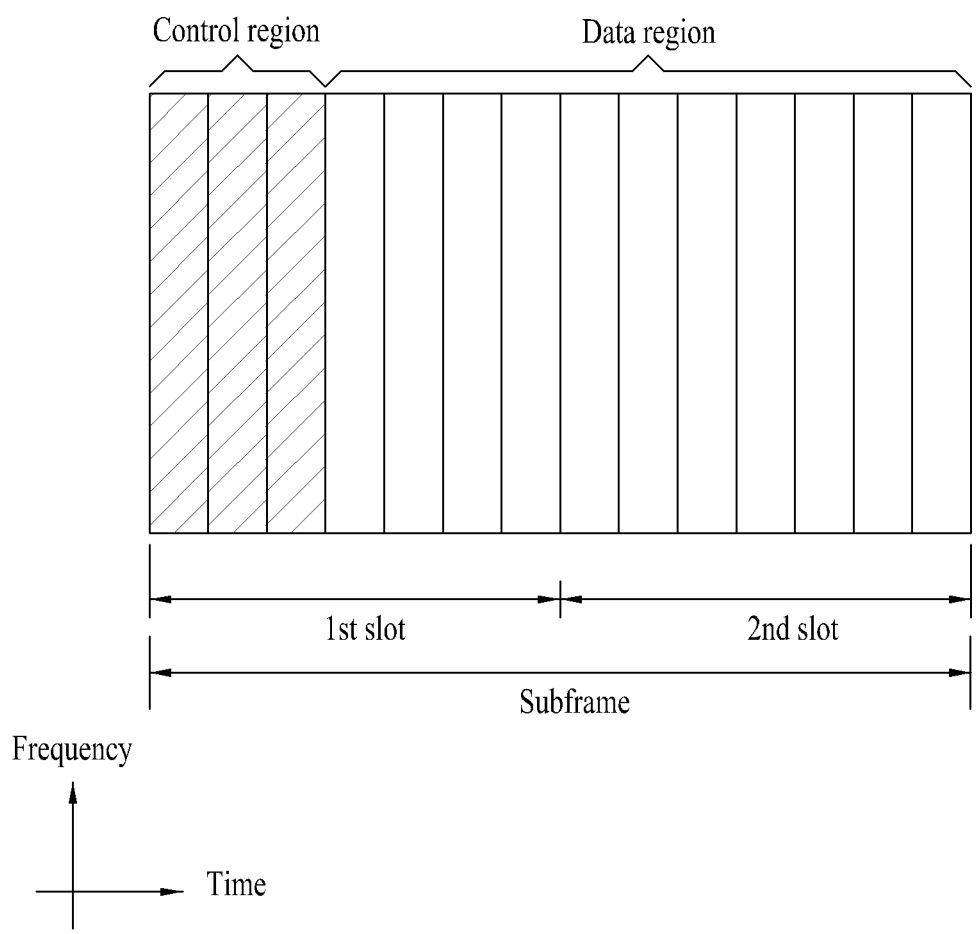
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
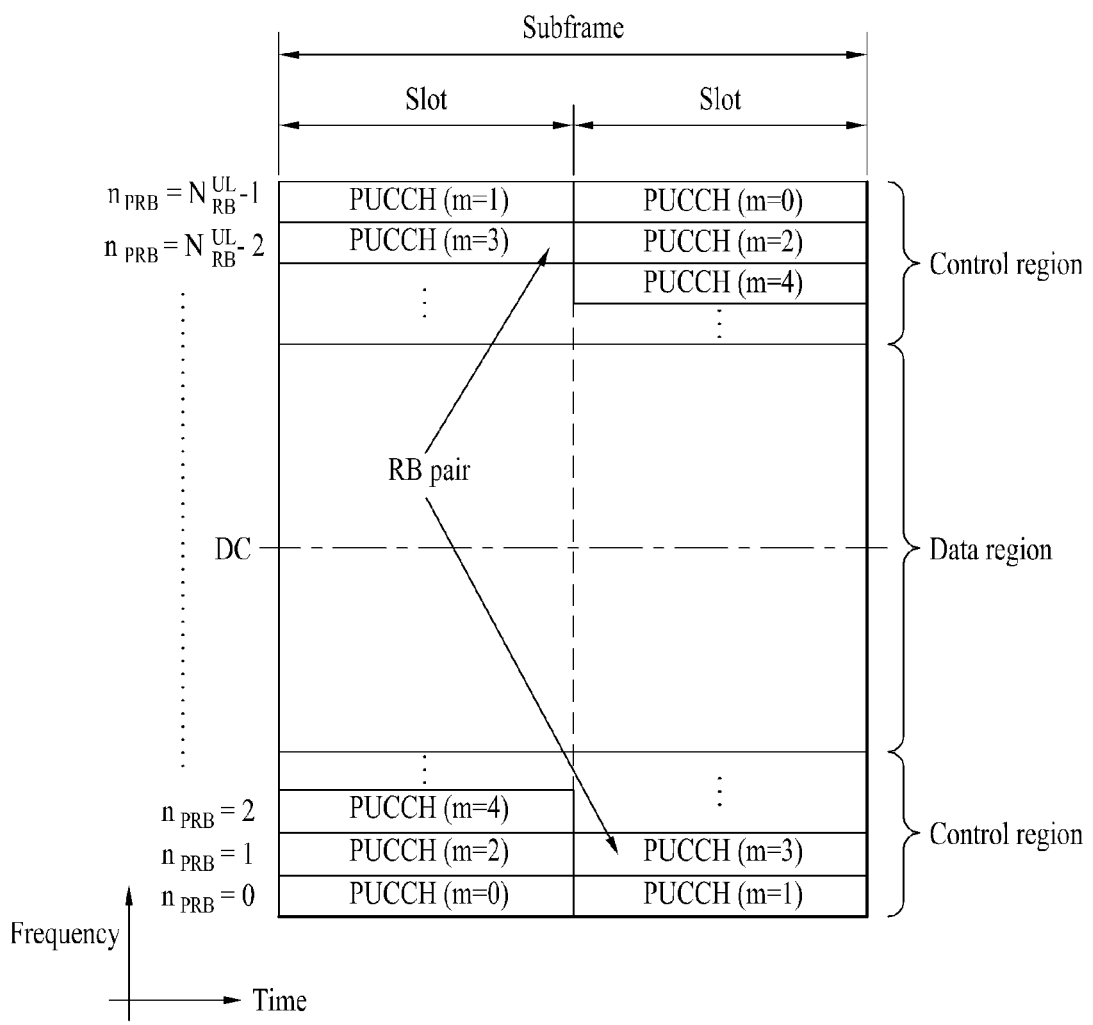
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant, N*subband W2 + wideband W1) |
| | UE selected (Subband CQI) | Mode 2-0<br>RI (only for Open-loop SM)<br>1st wideband CQI(4 bit) + Best-M CQI(2 bit)<br>(Best-M CQI: average CQI for selected M SB(s) among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| | Higher Layer-configured (Subband CQI) | Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant, N*subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI transmission via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.
ii) Type 2: A wideband CQI and a PMI (WB-CQI/PMI) are transmitted.
iii) Type 3: An RI is transmitted.
iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 7, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, . . . }.

The CQI is transmitted at a time of J*K rather than when the wideband CQI/PMI is transmitted.

In Table 7, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 7 are all determined at the higher layer of the UE and signaled to a physical layer of the UE.

Hereinafter, a feedback operation according to the mode of the UE will be described with reference to Table 7. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

The present invention provides a method for setting a maximum number of resource blocks (RBs), permitted for a UE to transmit uplink control information (UCI) only, according to PUSCH feedback mode when an eNB triggers aperiodic channel state information (CSI) reporting. The UE determines whether to transmit UCI only based on a PUSCH feedback mode and the number of allocated RBs. When the number of RBs allocated to the UE by the eNB is greater than a predetermined value, the UE transmits UCI and UL data together through a PUSCH.

CSI feedback can be classified into the following two types in a wireless communication system such as LTE Rel-12. The UE periodically transmits CSI through PUCCH feedback. Otherwise, the eNB requests the UE to transmit CSI through aperiodic CSI reporting triggering such that the UE can aperiodically transmit the CSI through PUSCH feedback. In LTE, switching between single-user MIMO (SU-MIMO) and multi-user MIMO (MU-MIMO) can be performed without specific signaling of a higher layer. Accordingly, feedback reporting accuracy and granularity need to be enhanced in order to improve the performance of MU-MIMO. PUSCH feedback mode 3-2 is suggested to improve the performance of MU-MIMO by providing a subband PMI.

In case of PUSCH feedback mode 3-2, bit-widths required for a CQI and PMI increase, compared to a conventional feedback mode, since the subband PMI is additionally included. The following table shows bit-widths of the CQI and PMI when a conventional 2Tx/4Tx codebook is used in PUSCH feedback mode 3-2.

TABLE 8

| | 2 Tx | | 4 Tx | |
|---|---|---|---|---|
| Field | Rank = 1 | Rank = 2 | Rank = 1 | Rank > 1 |
| WB CQI for CW 0 | 4 | 4 | 4 | 4 |
| SB differential CQI for CW 0 | 2N | 2N | 2N | 2N |
| WB CQI for CW 1 | 0 | 4 | 0 | 4 |
| SB differential CQI for CW 1 | 0 | 2N | 0 | 2N |
| Subband PMI | 2N | N | 4N | 4N |
| Sum | 4N + 4 | 5N + 8 | 6N + 4 | 8N + 8 |

The following table shows bit-widths of the CQI and PMI when an enhanced 4Tx codebook is used in PUSCH feedback mode 3-2.

TABLE 9

| Field | Rank = 1 | Rank = 2 | Rank = 3 | Rank = 4 |
|---|---|---|---|---|
| WB CQI for CW 0 | 4 | 4 | 4 | 4 |
| SB differential CQI for CW 0 | 2N | 2N | 2N | 2N |

TABLE 9-continued

| Field | Rank = 1 | Rank = 2 | Rank = 3 | Rank = 4 |
|---|---|---|---|---|
| WB CQI for CW 1 | 0 | 4 | 4 | 4 |
| SB differential CQI for CW 1 | 0 | 2N | 2N | 2N |
| WB first PMI | 4 | 4 | 0 | 0 |
| SB second PMI | 4N | 4N | 4N | 4N |
| Sum | 6N + 8 | 8N + 12 | 8N + 8 | 6N + 8 |

The following table shows bit-widths of the CQI and PMI when an 8Tx codebook is used in PUSCH feedback mode 3-2.

TABLE 10

| Field | Rank = 1 | Rank = 2 | Rank = 3 | Rank = 4 |
|---|---|---|---|---|
| WB CQI for CW 0 | 4 | 4 | 4 | 4 |
| SB differential CQI for CW 0 | 2N | 2N | 2N | 2N |
| WB CQI for CW 1 | 0 | 4 | 4 | 4 |
| SB differential CQI for CW 1 | 0 | 2N | 2N | 2N |
| WB first PMI | 4 | 4 | 2 | 2 |
| SB second PMI | 4N | 4N | 4N | 3N |
| Sum | 6N + 8 | 8N + 12 | 8N + 10 | 7N + 10 |
| Field | Rank = 5 | Rank = 6 | Rank = 7 | Rank = 8 |
| WB CQI for CW 0 | 4 | 4 | 4 | 4 |
| SB differential CQI for CW 0 | 2N | 2N | 2N | 2N |
| WB CQI for CW 1 | 4 | 4 | 4 | 4 |
| SB differential CQI for CW 1 | 2N | 2N | 2N | 2N |
| WB first PMI | 2 | 2 | 2 | 0 |
| SB second PMI | 0 | 0 | 0 | 0 |
| Sum | 4N + 10 | 4N + 10 | 4N + 10 | 4N + 8 |

In Tables 8, 9 and 10, N denotes the number of subbands defined in the system bandwidth. When the eNB triggers aperiodic CSI reporting and specific conditions are satisfied, the UE transmits UCI only on a PUSCH. That is, the UE does not transmit a transport block for UL-SCH even on the PUSCH.

A CSI request field for triggering aperiodic CSI reporting may be 1 bit or 2 bits. 2 bits are used for the UE to be assigned a plurality of CSI processes or CSI reporting for a plurality of serving cells and 1 bit is used in other cases. Values of 2-bit CSI request field and description thereof are shown in the following tables.

TABLE 11

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a 1st set of serving cells configured by higher layers |
| '11' | Aperiodic CSI report is triggered for a 2nd set of serving cells configured by higher layers |

TABLE 12

| Value of CSI request field | Description |
|---|---|
| '00' | No aperiodic CSI report is triggered |
| '01' | Aperiodic CSI report is triggered for a set of CSI process(es) configured by higher layers for serving cell c |
| '10' | Aperiodic CSI report is triggered for a 1st set of CSI process(es) configured by higher layers |
| '11' | Aperiodic CSI report is triggered for a 2nd set of CSI process(es) configured by higher layers |

The aforementioned specific conditions are as follows.

When $29 \leq$ MCS index $I_{MCS} \leq 31$;

DCI format 0 is used and $I_{MCS}=29$, or DCI format 4 is used, only one TB is enabled and $I_{MCS}=29$ for the enabled TB; and "CSI request" field is 1 bit and is configured to trigger aperiodic CSI report and the number of allocated RBs is 4 or less, "CSI request" field corresponds to 2 bits, aperiodic CSI report for one serving cell is triggered and the number of allocated RBs is 4 or less, "CSI request" field corresponds to 2 bits, aperiodic CSI report for one or more serving cells is triggered and the number of allocated RBs is 20 or less, "CSI request" field corresponds to 2 bits, aperiodic CSI report for one CSI process is triggered and the number of allocated RBs is 4 or less or "CSI request" field corresponds to 2 bits, aperiodic CSI report for one or more CSI processes is triggered and the number of allocated RBs is 20, The UE transmits only UCI for a PUSCH mode configured therefor on a PUSCH without UL data, as described above.

A subband size according to DL system bandwidth is determined by the following table. For example, when the DL system bandwidth corresponds to 110 RBs, the number of subbands is determined as N=ceil(110/8)=14. Accordingly, a maximum CQI/PMI bit-width is 8N+12=124 bits in PUSCH feedback mode 3-2.

TABLE 13

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

When DCI (downlink control information) format 0 is used, MCS index $I_{MCS}=29$, the CSI request field is 1 bit, aperiodic CSI report is triggered and 4 RBs are assigned to a subband, a code rate of PUSCH feedback mode 3-2 of the UE transmitting 124-bit CQI/PMI is shown in the following table.

TABLE 14

| PUSCH FB Mode 3-2 | PUSCH Contents |||||||
|---|---|---|---|---|---|---|
| | CQI/ PMI | CQI/ PMI SRS | CQI/ PMI A/N (or RI) | CQI/ PMI SRS A/N (or RI) | CQI/ PMI A/N RI | CQI (/PMI) SRS A/N RI |
| Normal CP code rate | 0.11 | 0.13 | 0.17 | 0.20 | 0.34 | 0.46 |
| Extended CP code rate | 0.14 | 0.15 | 0.23 | 0.28 | 0.69 | 1.38 |

As shown in Table 14, the code rate exceeds 1 when extended CP is used and CQI, PMI, ACK/NACK, SRS and RI are assigned to the same PUSCH and simultaneously transmitted. In this case, reliable UCI transmission may not be achieved.

To solve the aforementioned problem, the present invention provides the method for setting a maximum number of RBs, permitted for the UE to transmit UCI only in aperiodic PUSCH feedback, according to PUSCH feedback mode. The UE transmits UCI only without UL data when the following conditions are satisfied.

The CSI request field is the same as that described in Tables 11 and 12.

When $29 \leq$ MCS index $I_{MCS} \leq 31$;

DCI format 0 is used and $I_{MCS}=29$ or DCI format 4 is used, only one TB is enabled, $I_{MCS}=29$ for the enabled TB and the number of transmission layers is 1; and "CSI request" field is 1 bit and is configured to trigger aperiodic CSI report and the number of allocated RBs is A or less, "CSI request" field corresponds to 2 bits, aperiodic CSI report for one serving cell is triggered and the number of allocated RBs is A or less, "CSI request" field corresponds to 2 bits, aperiodic CSI report for one or more serving cells is triggered and the number of allocated RBs is 5A or less, "CSI request" field corresponds to 2 bits, aperiodic CSI report for one CSI process is triggered and the number of allocated RBs is A or less or "CSI request" field corresponds to 2 bits, aperiodic CSI report for one or more CSI processes is triggered and the number of allocated RBs is 5A or less, The UE transmits only UCI for a PUSCH mode configured therefor on a PUSCH without UL data, as described above.

Here, A can be determined as shown in the following table.

TABLE 15

| PUSCH FB mode | A |
|---|---|
| 2-0 | 4 |
| 3-0 | 4 |
| 1-2 | 4 |
| 2-2 | 4 |
| 3-1 | 4 |
| 3-2 | 6 |

For example, when aperiodic PUSCH report is triggered for one CSI process and 5 RBs are allocated, a UE set to PUSCH feedback mode 3-2 can transmit UCI only on a PUSCH and UEs set to other feedback modes can transmit UCI and UL data together. Table 15 is an embodiment of the present invention and the present invention includes a method for setting a maximum number of allocated RBs per PUSCH feedback mode.

Embodiment 1

In another embodiment of the present invention, up to 6 RBs can be set to transmit UCI only when specific conditions are satisfied in PUSCH feedback mode 3-2 and up to 4 RBs can be set to transmit UCI only as in the conventional scheme in other cases. At least one of a specific codebook, a specific CP type and a specific rank can be used as the specific condition. For example, up to 6 RBs are set to transmit UCI only when some or all conditions of CP type=extended CP, codebook=8Tx codebook, legacy 4Tx codebook or alternative (or enhanced) 4Tx codebook and rank=2, 3, or 4 are satisfied.

Embodiment 2

In another embodiment of the present invention, when the CSI request field is 2 bits, aperiodic CSI report is defined for one CSI process and the corresponding CSI process is set to PUSCH feedback mode 3-2, the UE can be configured to transmit only UCI if the number of RBs assigned thereto is 6 or less. When the CSI request field is 2 bits, aperiodic CSI report is defined for one CSI process and the corresponding CSI process is set to a PUSCH feedback mode other than PUSCH feedback mode 3-2, the UE can be configured to transmit only UCI if the number of RBs assigned thereto is 4 or less.

Also, when aperiodic CSI report is defined for a plurality of CSI processes and the CSI processes are set to same PUSCH feedback mode, the UE may be configured to transmit only UCI if the number of RBs allocated thereto is 5A or less.

When aperiodic CSI report is defined for a plurality of CSI processes and the CSI processes are set to different PUSCH feedback modes or when aperiodic CSI report is triggered for a plurality of serving cells and the serving cells are set to different PUSCH feedback modes, the UE can operate as follows.

When aperiodic CSI report is triggered for a plurality of CSI processes or a plurality of serving cells, the UE can be configured to transmit only UCI when the number of RBs allocated to the UE is less than the sum of A values (i.e. a maximum number of RBs, permitted to transmit only UCI) corresponding to PUSCH feedback modes set for the respective CSI processes or serving cells.

For example, when a first CSI process is set to PUSCH feedback mode 1-2, a second CSI process is set to PUSCH feedback mode 2-2 and a third CSI process is set to PUSCH feedback mode 3-2, the UE can be configured to transmit only UCI when 4+4+6=14 RBs or less are allocated to the UE.

Embodiment 3

In accordance with another embodiment of the present invention, when aperiodic CSI report is triggered for a plurality of CSI processes or a plurality of serving cells, a method of transmitting only UCI by a UE without UL data can be set under the following conditions. When one or more CSI processes from among the plurality of CSI processes are set to PUSCH feedback mode 3-2, the UE can be configured to transmit only UCI when 30 RBs or less are allocated thereto.

For example, when a first CSI process is set to PUSCH feedback mode 1-2, a second CSI process is set to PUSCH feedback mode 2-2 and a third CSI process is set to PUSCH feedback mode 3-2, the UE can be configured to transmit only UCI when 30 RBs or less are allocated thereto. Accordingly, when the plurality of CSI processes does not include a CSI process set to PUSCH feedback mode 3-2, the UE can be configured to transmit only UCI under the condition that 20 RBs or less are allocated thereto.

Embodiment 4

Alternatively, when the CSI request field is 2 bits and aperiodic CSI report is triggered for one CSI process or one serving cell, the UE can be configured to transmit only UCI when 4 RBs or less are allocated thereto. When the CSI request field is 2 bits and aperiodic CSI report is triggered for a plurality of CSI processes or a plurality of serving cells, the UE can be configured to transmit only UCI under the condition that 20 RBs or less are allocated to the UE.

Figure 5:
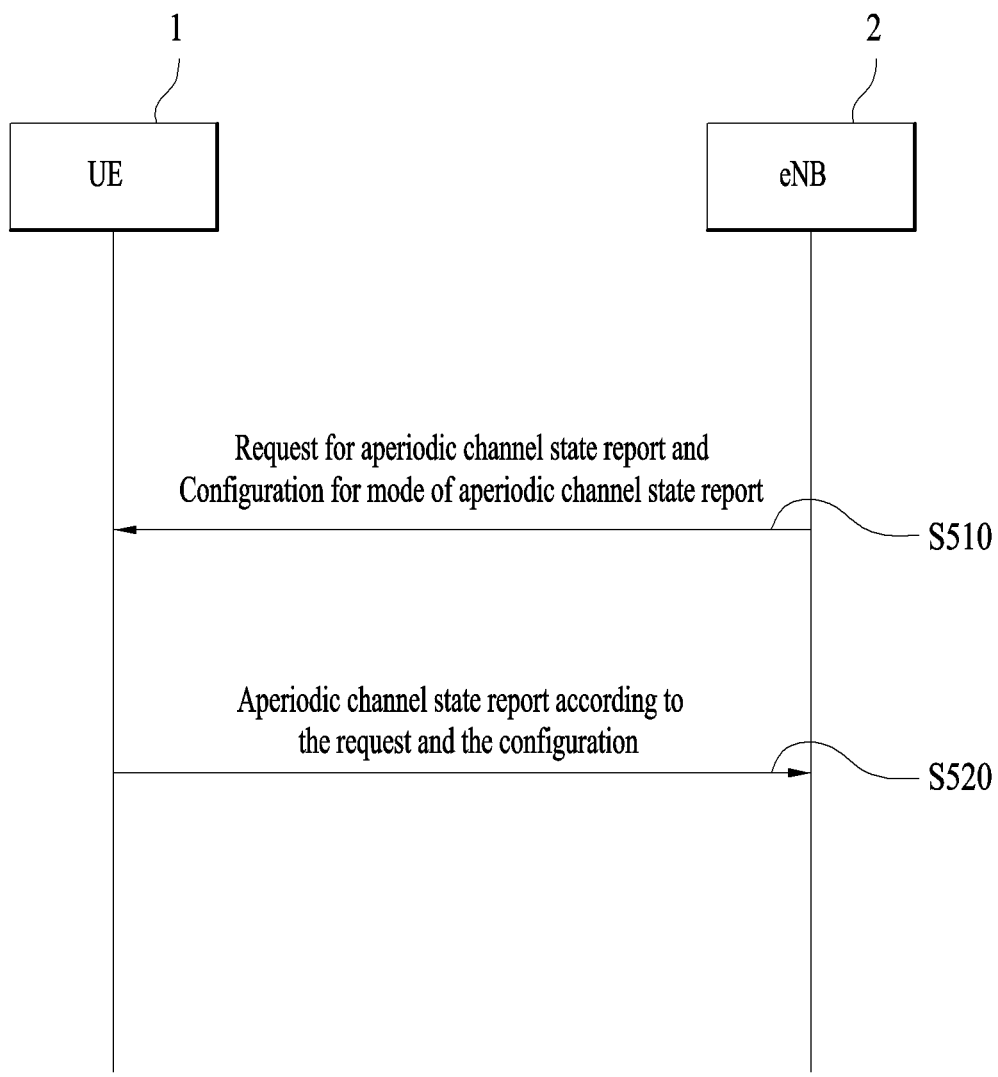
FIG. 5 is a diagram showing operation according to one embodiment of the present invention.

FIG. 5 illustrates a process according to an embodiment of the present invention.

UE 1 may receive, from eNB 2, a request for aperiodic channel state report and information on configuration of an aperiodic channel state report mode (S510). The report may be a 2-bit or 1-bit value according to Tables 11 and 12 and may be received through DCI format 0 or 4, for example.

UE 1 may transmit the aperiodic channel state report through an uplink data channel according to the request and the configuration (S520). When a bandwidth narrower than a predetermined uplink bandwidth is allocated, only the aperiodic channel state report can be transmitted through the uplink data channel. The predetermined bandwidth can be set per report mode.

As described above, the aperiodic channel state report can be set for a plurality of CSI processes or a plurality of serving cells. In addition, when a bandwidth less than the sum of bandwidths predetermined for respective aperiodic channel state report modes is allocated for uplink, only the aperiodic channel state report can be transmitted through the uplink data channel.

Alternatively, when at least one of aperiodic channel state report modes is a specific mode, only the aperiodic channel state report can be transmitted when a bandwidth less than a specific value is allocated for uplink. The specific mode may be PUSCH feedback mode including a subband PMI report.

When a bandwidth wider than the bandwidth predetermined for uplink is allocated, the UE can transmit the aperiodic channel state report along with uplink data through the uplink data channel.

FIG. 5 illustrates only part of an embodiment of the present invention and some of the aforementioned embodiments can be applied to FIG. 5.

Figure 6:
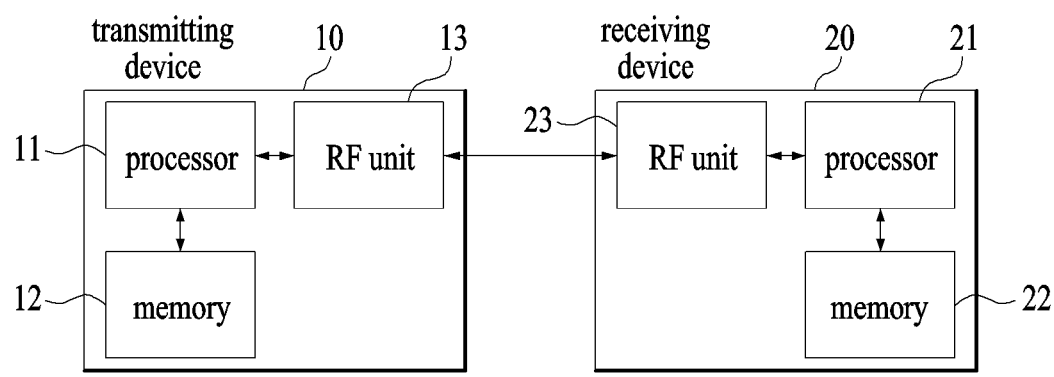
FIG. 6 is a block diagram of an apparatus for implementing embodiment(s) of the present invention.

FIG. 6 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method for transmitting, by a user equipment, an uplink control information (UCI), including a channel state information (CSI), to an eNodeB in a wireless communication system, the method comprising:
   receiving a request for the CSI and information on a configuration of a physical uplink shared channel (PUSCH) feedback CSI reporting mode; and
   transmitting the UCI through a PUSCH according to the request and the configuration,
   wherein, if a number of allocated resource blocks (RBs) is less than a predetermined reference value, only the UCI is transmitted through the PUSCH,
   wherein the predetermined reference value is differently determined depending on the PUSCH feedback mode; and
   wherein the predetermined reference value is set to a first value (M) when the PUSCH feedback mode is a first PUSCH feedback mode, and the predetermined reference value is set to a second value (K) when the PUSCH feedback mode is a second PUSCH feedback mode different from the first PUSCH feedback mode, where M≠K; and
   the method further comprising:
   wherein M is greater than K when the first PUSCH feedback mode includes a report of a subband precoding matrix indicator (PMI) and the second PUSCH feedback mode does not include a report of a subband PMI.

2. The method according to claim 1, wherein:
   the predetermined reference value is set to M+K when the CSI is set for first and second CSI processes;
   the PUSCH feedback mode of the first CSI process is the first PUSCH feedback mode; and the PUSCH feedback mode of the second CSI process is the second PUSCH feedback mode.

3. The method according to claim 1, wherein:
the predetermined reference value is set to M+K when the UCI is set for first and second serving cells;
the PUSCH feedback mode of the first serving cell is the first PUSCH feedback mode; and
the PUSCH feedback mode of the second serving cell is the second PUSCH feedback mode.

4. The method according to claim 1, wherein, if the number of allocated RBs is greater than the predetermined reference value, the UCI is transmitted along with uplink data through the PUSCH.

5. A method for receiving, by an eNodeB, an uplink control information (UCI), including a channel state information (CSI), from a user equipment in a wireless communication system, the method comprising:
transmitting a request for a channel state information (CSI) and information on a configuration of a physical uplink shared channel (PUSCH) feedback mode; and
receiving the UCI through a PUSCH according to the request and the configuration,
wherein, if a number of allocated resource blocks (RBs) is less than a predetermined reference value, only the UCI is received through the PUSCH,
wherein the predetermined reference value is differently determined depending on the PUSCH feedback mode; and
wherein the predetermined reference value is set to a first value (M) when the PUSCH feedback mode is a first PUSCH feedback mode, and the predetermined reference value is set to a second value (K) when the PUSCH feedback mode is a second PUSCH feedback mode different from the first PUSCH feedback mode, where M≠K; and
the method further comprising:
wherein M is greater than K when the first PUSCH feedback mode includes a report of a subband precoding matrix indicator (PMI) and the second PUSCH feedback mode does not include a report of a subband PMI.

6. The method according to claim 5, wherein:
the predetermined reference value is set to M+K when the CSI is set for first and second CSI processes;
the PUSCH feedback mode of the first CSI process is the first PUSCH feedback mode; and
the PUSCH feedback mode of the second CSI process is the second PUSCH feedback mode.

7. The method according to claim 5, wherein:
the predetermined reference value is set to M+K when the UCI is set for first and second serving cells;
the PUSCH feedback mode of the first serving cell is the first PUSCH feedback mode; and
the PUSCH feedback mode of the second serving cell is the second PUSCH feedback mode.

8. The method according to claim 5, wherein, if the number of allocated RBs is greater than the predetermined reference value, the UCI is received along with uplink data through the PUSCH.

9. A user equipment configured to transmit an uplink control information (UCI), including a channel state information (CSI), to an eNodeB (eNB) in a wireless communication system, comprising:
a radio frequency (RF) unit; and
a processor operably coupled with the RF unit, the processor being configured to:
receive a request for a channel state information (CSI) and information on a configuration of a physical uplink shared channel (PUSCH) feedback mode; and
transmit the UCI through a PUSCH according to the request and the configuration,
wherein, if the number of allocated resource blocks (RBs) is less than a predetermined reference value, only the UCI is transmitted through the PUSCH, and
wherein the predetermined reference value is differently determined depending on the PUSCH feedback mode; and
wherein the predetermined reference value is set to a first value (M) when the PUSCH feedback mode is a first PUSCH feedback mode, and the predetermined reference value is set to a second value (K) when the PUSCH feedback mode is a second PUSCH feedback mode different from the first PUSCH feedback mode, where M≠K; and
wherein M is greater than K when the first PUSCH feedback mode includes a report of a subband precoding matrix indicator (PMI) and the second PUSCH feedback mode does not include a report of a subband PMI.

* * * * *